United States Patent
Brengman et al.

[15] 3,662,171
[45] May 9, 1972

[54] METHANE GAS DETECTION SYSTEM USING INFRARED

[72] Inventors: Andrew J. Brengman, Santa Clara; Maxwell R. Krasno, San Mateo, both of Calif.

[73] Assignee: Textron, Inc., Belmont, Calif.

[22] Filed: Sept. 21, 1970

[21] Appl. No.: 73,787

[52] U.S. Cl. .................................. 250/83.3 H, 250/43.5 R
[51] Int. Cl. ....................................................... G01n 21/26
[58] Field of Search ........................... 250/43.5 R, 83.3 H

[56] References Cited

UNITED STATES PATENTS 3,032,655   5/1962   Romans ........................... 250/43.5 R
3,475,963   11/1969   Astheimer ..................... 250/83.3 H X
3,194,962   7/1965   Carlon et al. ..................... 250/43.5 R Primary Examiner—Archie R. Borchelt
Attorney—Gregg, Hendricson & Caplan

[57] ABSTRACT

A gas detection system utilizing infrared absorption properties of the gas in a very narrow, predetermined wavelength band located in an atmospheric spectrum window. An airborne surveillance system employs the earth as a temperature source and compensates for temperature changes by utilization of reference and analysis frequency bands while employing a large field of view.

11 Claims, 7 Drawing Figures

INVENTOR
MAXWELL R. KRASNO
ANDREW J. BRENGMAN
BY
Gregg, Hendricson & Caplan
ATTORNEYS

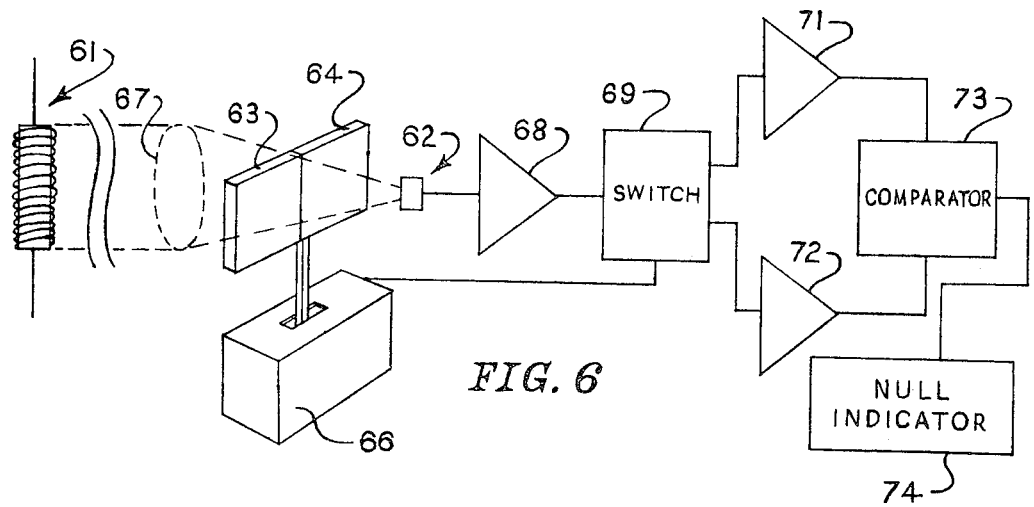
FIG. 6
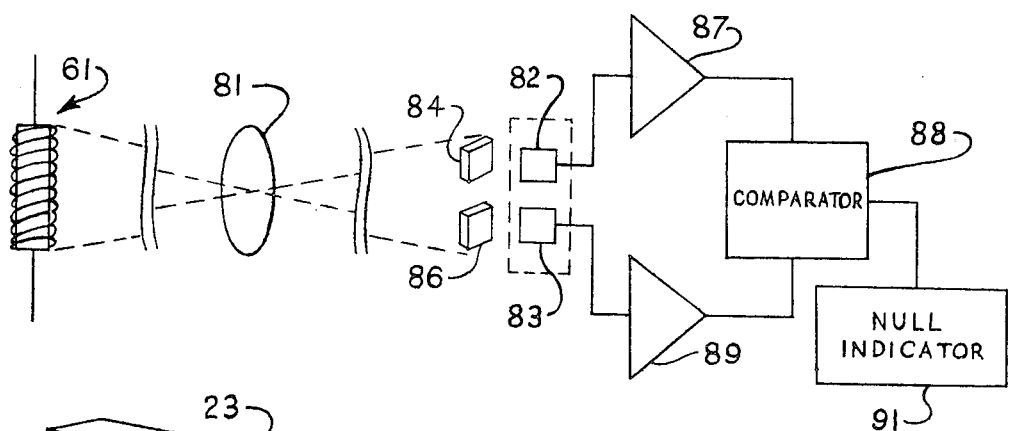
FIG. 7
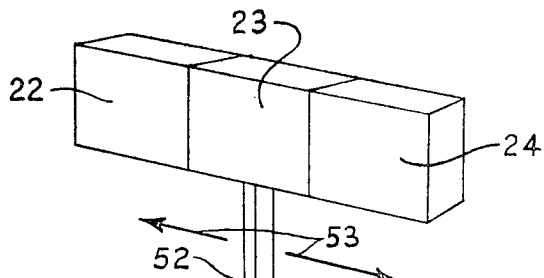
FIG. 5
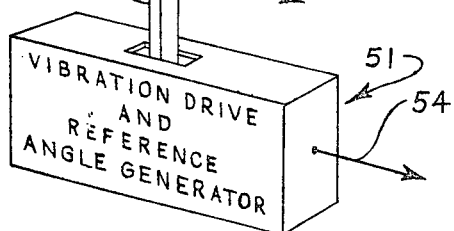
INVENTOR
MAXWELL R. KRASNO
ANDREW J. BRENGMAN
BY
Gregg, Henderson & Caplan
ATTORNEYS

METHANE GAS DETECTION SYSTEM USING INFRARED

BACKGROUND OF INVENTION

A variety of different gas detection devices and systems have been devised and such systems commonly provide for obtaining a sample of the atmosphere in which a gas may be present and then operating upon the sample to determine the presence or absence of the particular gas in question. It is common to employ spectral analysis for this purpose. Sampling of the atmosphere for gas detection has certain limitations such as, for example, when it is desired to check for gas leaks over an extended distance such as, for example, along a high pressure gas line.

In the United States alone there is an excess of 150,000 miles of natural gas transmission pipelines. These lines pose a potential hazard of substantial magnitude. Natural gas, for example, is transmitted through pipelines at very high pressures and thus even small leaks in a line may allow the escape of a substantial amount of gas. Such gas is potentially explosive and there have in fact occurred gas explosions of serious proportions resulting from undetected pipeline leaks. Conventional methods of searching for pipeline leaks include physical travel along the line in a surface vehicle such as a truck or a jeep with gas sampling means wherein samples of the atmosphere are periodically or continuously checked to determine the presence of escaping gas such as methane from a natural gas line. This particular method can only proceed at a very limited pace such as for example 10 miles per day per vehicle, which is manifestly too slow for proper and complete pipeline surveillance. Visual observation of pipelines from airplanes has also been employed but this is normally limited to observation of the results of gas leaks such as dirt or the like being blown about by a high pressure leak or damage to foliage as eventually results from gas leaks in the vicinity of vegetation.

There has also been proposed an aircraft surveillance method for gas pipelines based upon the expected Joule-Thompson cooling effect on gas escaping from a small aperture under high pressure. Difficulties with such a system include the undesirable detection and location of a variety of different cool regions on the earth resulting from shadows, water content and the like, and also negation of the effect under those circumstances wherein the pipeline is deeply buried and the gas filtering slowly through the earth to the surface essentially assumes the temperature of the earth and then slightly thereafter the temperature of the atmosphere thereabove.

The present invention proceeds in an entirely alternative manner by depending upon temperature only to the extent that the apparent gas temperature differs, if even slightly, from the earth surface temperature. The gas itself, by absorption of certain wavelength radiation, provides detector signals identifying presence of the gas and the present invention is not dependent upon ground or earth temperature which changes from time to time and place to place, with or without the presence of gas.

SUMMARY OF INVENTION

The present invention provides method and apparatus for detection of gas such as, for example, methane for the purpose of locating otherwise undetected leaks in gas transmission lines and associated equipment. Infrared radiation is detected in a predetermined narrow wavelength band lying within a region of high absorbance by the gas in question and also within region of low absorbance by water vapor in the atmosphere. A material change in the detected radiation indicates the presence of the particular gas in question.

The present invention is particularly adapted to rapid surveillance of extended gas transmission lines and the like by the use of an airborne detector wherein the earth is employed as a source of infrared radiation and such radiation is detected in a first narrow analysis band and a second narrow reference band. Errors that might arise through variations in source temperature or emissivity are compensated for by reference band detection as well as periodic nulling of the detector output, and softening of the leading and trailing edges of the detector response. Errors that might arise through the presence of other gas in the volume being surveyed or water vapor in such volume is substantially precluded herein by the choice of the appropriate infrared regions detected together with relatively low altitude surveillance and narrow band width detection. Other possible sources or error such as, for example, air turbulence and localized temperature variations upon the earth's surface are precluded by the utilization of a relatively large field of view for the detector.

The present invention is also adapted for fixed detection systems in which a controlled high temperature source is employed.

DESCRIPTION OF FIGURES

The present invention is illustrated as to particular preferred embodiments in the accompanying drawings wherein:

FIG. 5 is a schematic illustration of an alternative vibrating filter assembly which may be employed in the system of the present invention;

FIG. 6 is a block diagram of a fixed detection system in accordance with the present invention; and FIG. 7 is a block diagram of an alternative fixed detection system in accordance with this invention.

DESCRIPTION OF PREFERRED EMBODIMENTS

The present invention will herein be described in connection with the detection of methane gas ($CH_4$), commonly termed natural gas, which is widely distributed through very high pressure gas lines from the vicinity of gas wells to areas of ultimate utilization. The present invention is, however, applicable to the detection of other gases, as will become apparent to those skilled in the art from the following description. The invention is also primarily described herein in connection with the detection and location of pipeline gas leaks from aircraft flying above the pipeline along the right of way thereof.

Figure 1:
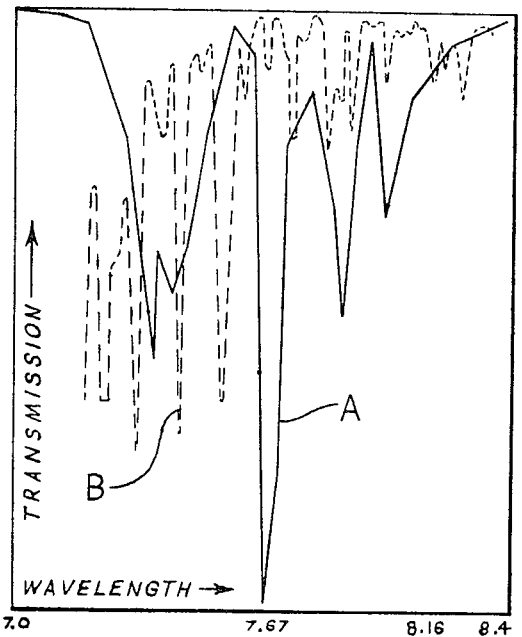
FIG. 1 is a plot of the transmission spectra of methane gas and water vapor in a limited spectrum range.

It is provided herein that gas detection of methane shall be carried out in the region of 7.2 to 8.3 micrometer infrared wavelength regions which is a region of strong infrared absorption by methane. It is first noted that infrared detectors of a wide variety are well known in the art and that consequently no detailed description thereof is included herein. FIG. 1, Curve A, generally represents transmission by methane of infrared radiation over a range of wavelength between 7.0 and 8.4 micrometers. Superimposed upon the plot of FIG. 1 is a representation of the transmission by water vapor in the atmosphere of infrared radiation. It is to be particularly noted that this wavelength range indicated in FIG. 1 is within what is normally termed a "window" in the atmosphere for transmission of infrared radiation. The general constituents of the atmosphere absorb infrared at certain wavelengths. However it is well known that there are so-called windows in the atmosphere wherein very little infrared absorption occurs at particular ranges of wavelengths, and the range identified in FIG. 1 is at the edge of such a window. Superimposed upon the transmission or absorption characteristics of methane for infrared radiation in FIG. 1 is the same characteristic for water vapor in the range of the graph. It will be particularly noted that in the range from about 7.67 to 8.16 micrometers methane gas materially absorbs infrared radiation and in particular this absorption characteristic of methane gas is most pronounced at about 7.67 to 7.78 micrometers, and in this more limited range it seems that the absorption by water vapor normally present in the atmosphere is extremely small. Further with regard to the present invention it is particularly noted that the methane absorption bands as indicated in FIG. 1 become emission bands if the methane gas is hotter than the source. This point is further commented upon below in connection with the method and system of aerial surveillance in accordance with the present invention.

Figure 2:
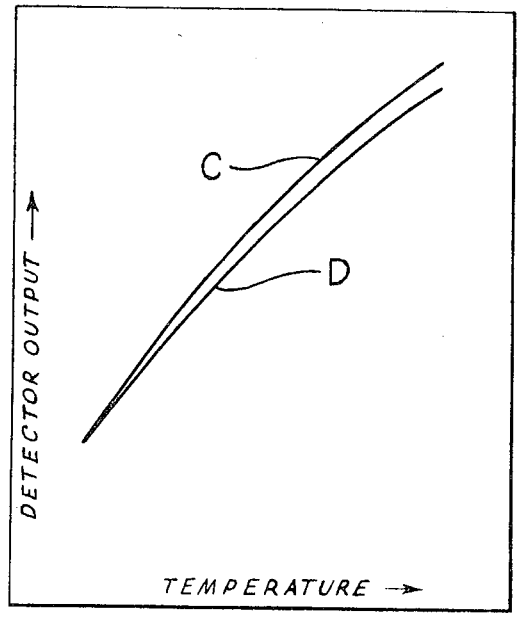
FIG. 2 is a graph of temperature function curves illustrating detector response to earth source in different wavelength bands over a range of temperatures.

Considering further the present invention and particularly the overall method and system thereof with regard to aerial surveillance for gas leak detection it is noted that the present invention employs the earth as a radiation source for infrared radiation. This may also be considered as a temperature source inasmuchas the temperature of the radiator is the basis for infrared radiation. While it might be considered that the average temperature of the earth is relatively constant, at least during the daytime, it is noted that in order for the present invention to operate satisfactorily it is necessary for compensation to be made for earth temperature variations. In part this is taken care of in the present invention by employing two different detector regions which are hereinafter termed an analysis region and a reference region. The above noted high absorption region from 7.67 to 8.16 micrometers is herein employed as an analysis region for the detection of the gas. Furthermore the present invention provides a reference region from about 8.16 micrometers to about 8.5 micrometers wherein methane gas exhibits very little absorption properties to infrared radiation passing therethrough. This invention proceeds to measure the average apparent temperature of the ground in the reference band noted above and this may be accomplished roughly by directly measuring the temperature of the detector itself which is kept substantially at the ambient air temperature and making appropriate assumptions about the relation between the ground vs. air temperature or, as is preferable in accordance with the present invention, by allowing the detector to look at itself during a portion of the measuring cycle and then to make a comparison of this reading in the reference band with a reading obtained in the same band from the earth source. By directly measuring the detector temperature by ordinary means such as by means of a thermistor this above difference will provide an accurate determination of the apparent temperature of the ground. Referring to FIG. 2 of the drawings there will be seen to be illustrated at Curve C the variation in detector response vs. temperature in an analysis band of 7.66 to 8.16 micrometers. Curve D represents the detector response to earth source in a reference band of 8.16 to 8.58 micrometers. It will be seen that as the temperature rises the curves separate and in accordance with the present invention provision is made for compensating for this difference. Please note further that the curves of FIG. 2 are plotted in the absence of the gas to be detected, i.e. in the present example, methane.

The foregoing discussion is based upon the earth being hotter than the gas to be detected. This is in fact the normal situation; however it is possible for the situation to be reversed. The earth may be cooled by evaporation from moist grass, for example, and the atmosphere then may be hotter than the earth. In this circumstance methane gas will radiate so that in the analysis band there will be received more radiation than in the reference band. This also then indicates the presence of methane. Only in the very unlikely circumstance that the ground and atmosphere above it are at the same apparent temperature will the present invention fail to identify methane in the atmosphere. It is also to be noted that the invention is not applicable to detect gas leaks when such gas is otherwise present in the atmosphere. Thus a marsh which emits marsh gas (methane) is not suitable as an area for gas leak surveillance.

Figure 3:
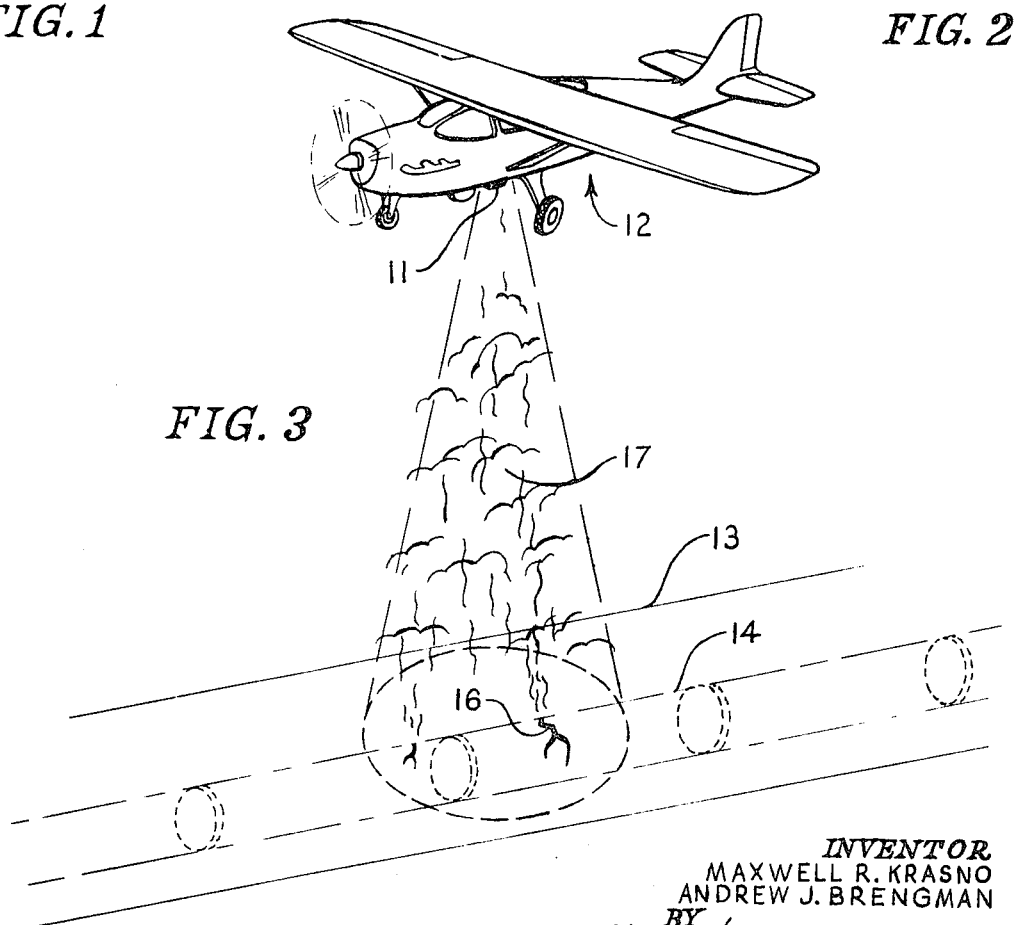
FIG. 3 is a schematic illustration of an airborne gas detection operation in accordance with the present invention.

Considering further the present invention, same is carried out by the disposition of a detector 11 upon an airplane 12 adapted to fly along the right of way 13 of a pipeline 14 for the purpose of detecting the leakage of gas from such a pipeline. The airplane is intended to be flown at a relatively low altitude as of the order of 300 to 500 feet above ground level. The infrared detector 11 carried by the airplane is physically or optically arranged to have a field of view downwardly of the order of 4 to 5 degrees of solid angle. At the above indicated altitude of plane flight this will then provide a field of view of the earth's surface of the order of 30 feet in diameter. There is indicated in FIG. 3 a gas leak 16 wherefrom methane gas 17, for example, escapes to pass generally upwards into the atmosphere. It is to be particularly noted that the gas line 14 may either be mounted above ground or may be buried but in any circumstance a gas leak therefrom will cause gas to ultimately escape into the atmosphere, as indicated at 17. The present invention does not depend upon any phenomenon of gas leak or manner of leakage but instead is dependent only upon the presence of this particular gas in the atmosphere between the detector and ground. It will be appreciated that an airplane 12 travelling at a minimal flight speed will be capable of traversing a very substantial distance of pipeline within a day as contrasted to conventional systems wherein physical travel along the earth's surface necessarily limits the possible traverse in any particular period of time.

Figure 4:
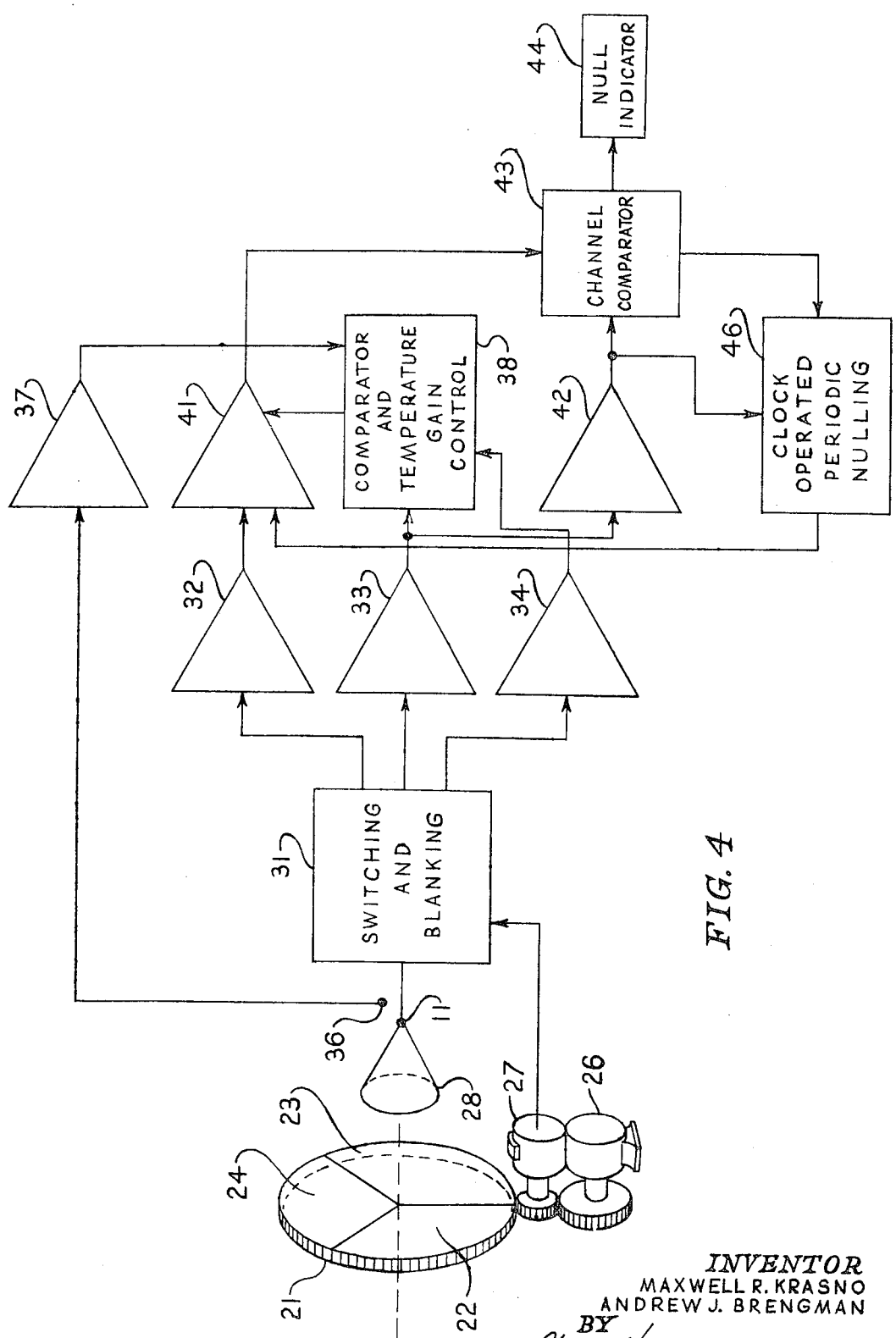
FIG. 4 is a block diagram of a detection system in accordance with the present invention.

Considering now actual detection of methane gas, for example, reference is made to FIG. 4 schematically illustrating a system suitable for aerial surveillance. The detector 11 as shown in FIG. 4 may comprise a conventional infrared detector having a good response in the range of wavelength indicated above. In distinction to prior art devices requiring a flat response across the detector area, the present invention employs a detector having less sensitivity at the edges thereof so that as a radiation spot moves across the detector there is produced a relatively slow variation in detected energy. This may be accomplished by conventional techniques of detector manufacture. The purpose of this particular detector characteristic employed herein is to produce substantially only a fundamental signal without a large number of harmonics and this then allows the signal to be filtered to remove high frequencies associated with square wave signals and yet to pass the desired signal from the detector hereof. This then provides a capability of discrimination against small area temperature variations in the earth source of infrared radiation.

Further with regard to the system of FIG. 4 there is shown to be included therein a filter wheel 21 having three equal segments comprised as an analysis band filter 22, a reference band filter 23, and a reflective segment 24. It is to be appreciated that infrared filters are well known in the art and that the filter segments 22 and 23 are thus formed of known materials or combinations thereof, passing only infrared radiation in the analysis and reference bands respectively. Choice of the analysis band and reference band has been discussed above. However it is noted that if the analysis band is to be limited to the range of 7.67 to 7.78 micrometers wavelength it is necessary in accordance with the present state of the art to control the temperature of the filters and while this poses a certain limitation upon the system, it does produce a fairly substantial gain in operation of the unit by limiting the associated noise and increasing the absorption effect of the smallest amount of $CH_4$. A reference band in the range of 8.16 to 8.4 micrometers wavelength is suitable although other reference bands are possible.

The filter wheel 21 is rotated as by an electric motor 26. A reference angle generator 27 is shown to be driven by the output of the motor 26 or the rotation of the filter wheel 21 or both in order to generate a signal indicating the angular position of the filter wheel. There may also be provided in the system a lens system 28 disposed, for example, between the filter wheel and the detector to focus radiation upon the detector. This lens system may also scramble the received radiation so as to further limit the effect of any small spot of materially different radiation from a limited area of different temperature on the surface of the earth viewed by the system. It will be seen that as the filter wheel 21 is rotated, the detector will view alternately the field of view through a reference band filter, the field of view through the analysis band filter and the detector itself. Further with regard to the filter wheel it is particularly noted that the reflecting sector 24 includes a reference band filter having a mirrored back side or side opposite to that of the detector from the wheel. Thus the detector, when viewing the sector 24, actually views itself through a reference band filter. The output of the detector 11 is applied to a switching and blanking circuit 31 which also receives the output of the reference angle indicator 27. The circuit 31 switches the output of the detector successively to an analysis band amplifier 32, a reference band amplifier 33, and a detector temperature amplifier 34. The actual temperature of the detector itself is measured by temperature measuring means such as a thermistor 36 having the output thereof applied to a thermistor amplifier 37. The output of the reference band ground reading amplifier 33, and the reference band detector reading amplifier 34, along with the output of the thermistor amplifier 37, which is the actual detector temperature, are all fed into a comparator 38 wherein there is stored the temperature function of FIG. 2. This comparator 38 produces an output signal which serves as a gain control signal for an amplifier 41 receiving the analysis band ground reading of the amplifier 32.

It is to be noted that the detector signals from the analysis band and reference band will differ even in the absence of methane gas in atmosphere, as discussed above in connection with FIG. 2 of the drawings. The comparator and temperature gain control unit 38 serves to compensate for this variation, i.e. to control the gain of the amplifier 41 in such a manner as to make the analysis band and reference band signals the same in the absence of methane gas in the atmosphere. The output of the reference band amplifier 33 is also applied to a further amplifier 42 with the outputs of the amplifiers 41 and 42 then being applied to a channel comparator 43 which compares the signals from these two amplifiers as representative of the signals detected in the analysis and reference bands. A null indicator 44 is connected to the output of the channel comparator to produce a continuous indication of the presence or absence of equality in the signals applied to the channel comparator. Aside from errors in the system the null indicator will indicate a zero reading in the absence of methane gas in the field of view of the detector but will produce a substantial reading, as for example, upon a strip chart or the like or a meter dial for any condition of methane gas in the field of view of the detector.

There is of course the possibility, and in fact the probability, of a slow drift in the system which in the system of FIG. 4 is illustrated to be compensated for or overcome by the clock-operated periodic nulling device or circuit 46 receiving the output from the channel comparator 43 and the amplifier 42 and applying a nulling signal to the input of the second analysis band amplifier 41. Automatic nulling may be accomplished every 30 seconds, for example, by this means.

Assuming that the duration of the difference in average emissivities exceeds the 30 second period between automatic updating or nulling, no drift of balance will be noticed at the null indicator. Should the difference change more rapidly the balance will drift off the null position between updatings. There is always the remote possibility that the aircraft carrying the detector 11 passes over an area wherein there is a leak of methane gas at the precise time that the system is automatically updated by the periodic nulling circuit 46. If this should happen it will be immediately evident from the null indicator in that the indication thereof will depart radically from null or a zero reading and will stay off balance or away from a null condition until the next updating or periodic nulling. Should this occur the operator would then retrace the aircraft path to fly over the same route and obtain a normal off-balance reading over the area including the escaping gas.

Various modifications in the system of FIG. 4 are possible and one more obvious modification lies in the manner of applying signals to the detector. It is, for example, possible to apply two or more signals at the same time to the detector by providing means for determining which portion of the detector output relates to which input. Alternatively it is possible in place of the filter wheel 21 to employ some type of vibrating device such as illustrated for example in FIG. 5. There is shown in FIG. 5 a vibration drive mechanism 51 having an arm 52 extending therefrom and vibrating at a preset frequency back and forth as indicated by the arrows 53. There may be mounted on this vibrating arm 53 the three filter sections 22, 23 and 24 according to the like numbered portions of the filter wheel 21 described above in connection with FIG. 4. By operating the vibration drive mechanism 51, the arm 52 is rapidly moved back and forth, as indicated by the arrows 53, to thus place the reference band filter 23 in front of the detector and then the reference band filter plus mirror 24 in front of the detector. This is then followed by return movement wherein the reference band filter 23 appears in front of the detector and this is followed by the analysis band filter 22 appearing in front of the detector. It will be appreciated that with this mechanism the sequence of filters is somewhat different from that of the rotating filter wheel 21. However this is taken care of by a reference angle generator being incorporated with the vibration drive 51 and having an output 54 which is applied to the switching and blanking circuit 31 in FIG. 4 so that the signals are applied in proper sequence to the appropriate amplifiers and following circuitry of the system for operation thereupon much in the manner as described above in connection with FIG. 4. It is to be further appreciated that the system of FIG. 4 either employing a filter wheel or vibrating filter system as described above may be designed to operate upon a single channel with sequential analysis balancing comparisons instead of employing the multiple channel system of FIG. 4.

While the present invention has been described above in connection with an airborne detection system for methane gas it is to be appreciated that the principles of the invention may also be applied to a fixed or mobile installation on the ground with a fixed path length between infrared radiation source and detector. In these latter applications of the present invention commented upon below it is possible to maintain the radiation source at a fixed temperature inasmuchas the earth is not employed as the radiation source. In this respect reference is made to FIG. 6 of the drawings illustrating one possible system for utilization as fixed or mobile installation on the ground and employing a temperature controlled source 61 viewed by a temperature controlled detector 62 at a fixed distance from the source. A pair of filters 63 and 64 passing the analysis band and reference band respectively are shown to be mounted upon a vibration drive mechanism 66, such as, for example, the type briefly described above and illustrated in FIG. 5. Some type of lens system 67 may be employed to focus radiation upon the detector through one or the other of the filters as they pass back and forth in front of the detector. The output of the detector is applied through an amplifier 68 to an electronic switch 69 in the same manner as in the system of FIG. 4. This switch is controlled by a filter position signal from the vibration drive mechanism 66 to alternately apply the outputs of the detector through an analysis amplifier 71 and a reference amplifier 72 to a comparator circuit 73. A null indicator 74 is connected to the comparator to provide an indication of difference between the radiation detected in the analysis band and reference band as an indication of the presence of methane gas between the detector and source.

In the circuit of FIG. 6 it is not necessary to compensate for variations in the source temperature, for the source is maintained at a constant temperature. It is furthermore noted that the detector outputs could be sequentially separated and compared rather than switched between separate channels for comparison.

With regard to fixed installations or mobile installations on the ground with a fixed optical path there may be employed a system requiring no moving parts. Referring to FIG. 7 there is illustrated a constant temperature source 61 having infrared radiation emanating therefrom focussed as by some type of lens system 81 upon a pair of temperature controlled detectors 82 and 83. Each of the detectors is provided with a separate filter as indicated at 84 and 86 with one filter passing only the analysis band and the other band passing only the reference band. The image of the source is focussed so that it is divided equally between the two detectors. It will thus be seen that the output of one detector, say detector 82, comprises only the detected infrared radiation in the analysis band and this is applied through an amplifier 87 to a comparator circuit 88. The output of the other detector 83 comprising detected radiation in the reference band is applied through an amplifier 89 to the comparator 88. An equality of signals applied to the comparator indicates the absence of methane gas in the fixed path between the detectors and source assuming that an equal amount of the source radiation is focussed on each of the detectors 82 and 83. A substantial difference between the signals applied to the comparator indicates the presence of methane gas and a null indicator 91 is connected to the comparator to provide a visual or recorded indication of the comparison.

Numerous additional alternatives and variations in the present invention are possible with regard to fixed installations or possibly mobile installations having a fixed distance between the detectors and source. It is possible to employ a retrodirective reflector to increase the radiation path length from detector to source and to actually dispose the detector and source next to each other but with the detector viewing only the reflector mirror. In this instance radiation from the source would then travel to the retrodirective reflector or mirror and there be returned to the detector. Similarly it is possible for a fixed installation to arrange mirrors in such a way as to direct radiation from a source about a boundary or along some predetermined path to one or more detectors. In all instances it is possible to provide for the detector to periodically view the source directly to compensate for drift in the system. With regard to airborne systems it is also noted that the field of view of the detector should be directed ahead of a helicopter carrying the system in order to preclude errors or difficulties resulting from airborne turbulence.

There has been described above an improved method and apparatus for detecting the presence of gas. The invention is particularly applicable to airborne surveillance for the detection of leaks in gas lines and the like. Although the invention has been described with respect to the detection of methane it is noted that the invention is equally applicable to the detection of other gases. One particular gas of interest is ammonia which is pumped at high pressure through gas lines and the present invention as described is directly applicable to ammonia detection by reversing the analysis and reference bands. Certain other gases require the selection of different analysis and reference bands for their detection. The invention is highly advantageous in producing an instantaneous indication of the presence of gas while rapidly traversing a gas line, for example, to thus afford the capability of rapidly monitoring extended distances of gas lines. There is also described above certain extensions of the present invention which may be employed for ground gas detection which find utility primarily in fixed installation such as gas pumping stations and the like.

It is not intended to limit the present invention to the precise details of description or illustration. It will be apparent to those skilled in the art that numerous variations and modifications of the method and apparatus hereof may be made within the proper scope of the invention.

What is claimed is:

1. A method of detecting the presence of methane gas in the atmosphere comprising the steps of
   directing an infrared detector toward a source of radiation at a distance therefrom,
   filtering a portion of the infrared radiation to limit same to an analysis wavelength band in a region of low infrared absorption by water vapor and high absorption by methane gas, said band lying in the range of 7.67 to 8.16 micrometers wavelength,
   filtering a portion of the infrared radiation to limit same to a reference wavelength band in a region of low infrared absorption by water vapor and methane gas, said reference band lying in the range of 8.16 to 8.58 micrometers wavelength,
   alternatively applying to said detector the filtered radiation of said analysis band and of said reference band,
   comparing the detector outputs for radiation detected in said analysis band and in said reference band, and
   indicating any difference resulting from said comparison as an identification of said presence of methane gas between said source and detector.

2. The method of claim 1 further defined by forming said detector to have a response that is maximum at the center thereof and which decreases toward the detector edges.

3. The method of claim 3 further defined by filtering the output of said detector to remove high frequency components therefrom.

4. The method of claim 1 further defined by measuring the temperature of said detector and at least periodically compensating the detector output for temperature variations thereof.

5. The method of claim 1 further defined by flying an airplane containing said infrared detector at an altitude in the range of 300 to 500 feet and limiting the field of view of said detector to a solid angle of the order of 4 to 5°.

6. The method of claim 1 further defined by said analysis band being limited substantially to the range of 7.67 to 7.78 micrometers wavelength.

7. A system for detection of methane gas in the atmosphere that may result from gas leaks in a high pressure pipeline comprising
   an airborne infrared detector;
   means directing said detector toward the earth as a source of infrared radiation at a distance therefrom to thus produce electrical signals having amplitudes proportional to detected radiation;
   first and second filter means respectively passing a first analysis band of infrared radiation wavelengths and a second reference band of infrared radiation wavelengths, said analysis band comprising wavelengths in the range of substantially 7.67 to 8.16 micrometers wavelength in which methane has a high absorption and there is very little absorption by water vapor, said reference band comprising wavelengths in the range of substantially 8.16 to 8.58 micrometers wavelength in which there is very little absorption by methane or water vapor;
   means rapidly moving said filter means to alternately dispose said first filter means and said second filter means in front of said detector whereby said detector produces output signals alternately responsive to detected infrared radiation in said analysis and reference bands;
   comparator means receiving the output of said detector and providing an alternating current comparison of the output signals thereof; and
   means indicating the results of said comparison.

8. A system for detection of a predetermined gas in the atmosphere that is not normally present therein in appreciable quantities comprising
   an infrared detector;
   means directing said detector toward a source of infrared radiation at a distance therefrom to thus produce electrical signals having amplitudes proportional to detected radiation;
   first and second filter means respectively passing a first analysis band of infrared radiation wavelengths and a second reference band of infrared radiation wavelengths, said analysis band comprising a range of wavelengths in which said predetermined gas has a high absorption and there is very little absorption by water vapor, said reference band comprising a range of wavelengths of which there is very little absorption by said gas or water vapor;

means rapidly moving said filter means to alternately dispose said first filter means and said second filter means in front of said detector whereby said detector produces output signals alternately responsive to detected infrared radiation in said analysis and reference bands;

temperature sensing means disposed adjacent said detector and producing electrical signals proportional to the detector temperature, an additional second filter means having a reflective surface on the side opposite thereof from said detector and moved with said first and second filter means across said detector to produce a temperature output signal from said detector comparator means receiving the output of said detector and providing an alternating current comparison thereof;

means compensating said comparator means by said detector temperature signal and temperature sensing means output; and means indicating the results of said comparison.

9. The system of claim 7 further defined by a filter position signal generator operating in synchronism with said filter movement and producing a switching signal indicating which filter is in front of said detector, a pair of amplifier channels connected to inputs of said comparator means, and switching means connected to said detector and controlled by said switching signal to apply analysis band detector signals to a first channel and reference band detection signals to a second channel.

10. The system of claim 9 further defined by a periodically operating nulling circuit connected to an amplifier in said first channel for periodically changing the gain thereof to compensate for drift in the system.

11. The system of claim 7 further defined by said detector being adapted for mounting upon an airplane with a field of view toward the ground of the order of 4 to 5° of solid angle, temperature sensing means disposed adjacent said detector and producing electrical signals proportional to detector temperature, an additional second filter means having a reflective surface on the opposite side thereof from said detector and moved with said first and second filter means across said detector to produce temperature output signals from said detector, a temperature function comparator storing the function of difference with temperature of detector response to earth source in said analysis band and said reference band, means applying to said temperature function comparator the output said temperature sensing means and the detector output from said second filter and other reflective second filter, controllable amplifying means connected to the output of said detector, and gain control means connected to said temperature function comparator and said amplifying means for controlling the amplification of detector signals in the analysis band to maintain a null indication in the absence of said predetermined gas in the field of view of said detector.

* * * * *